United States Patent
Hongu et al.

(10) Patent No.: US 7,376,055 B2
(45) Date of Patent: May 20, 2008

(54) METHOD OF ANNEALING OPTICAL RECORDING MEDIUM

(75) Inventors: Kazuoki Hongu, Zushi (JP); Yasushi Hozumi, Ageo (JP); Yukari Aoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 554 days.

(21) Appl. No.: 11/033,727

(22) Filed: Jan. 13, 2005

(65) Prior Publication Data

US 2005/0162987 A1    Jul. 28, 2005

(30) Foreign Application Priority Data

| Jan. 23, 2004 | (JP) | ............................. 2004-015750 |
| Mar. 29, 2004 | (JP) | ............................. 2004-095320 |
| Apr. 21, 2004 | (JP) | ............................. 2004-125630 |

(51) Int. Cl.
*G11B 7/00* (2006.01)
(52) U.S. Cl. .................. 369/44.37; 369/53.28
(58) Field of Classification Search ...................... None
See application file for complete search history.

(56) References Cited

U.S. PATENT DOCUMENTS

| 6,197,440 B1 | 3/2001 | Shiratori ............... 428/694 SC |
| 6,243,352 B1* | 6/2001 | Kanno et al. ............ 369/275.1 |
| 6,767,697 B2 | 7/2004 | Uchida et al. ............... 430/321 |
| 2002/0058120 A1 | 5/2002 | Uchida et al. ............. 428/64.4 |
| 2003/0002430 A1 | 1/2003 | Kim et al. ................ 369/275.4 |
| 2004/0017736 A1* | 1/2004 | Suzuki et al. ............. 369/13.09 |
| 2004/0071050 A1* | 4/2004 | Sumioka .................. 369/13.47 |
| 2004/0090875 A1* | 5/2004 | Uchida et al. ........... 369/13.55 |

FOREIGN PATENT DOCUMENTS

| JP | 6-290496 | 10/1994 |
| JP | 11-195252 | 7/1999 |
| JP | 2000-187898 | 7/2000 |
| JP | 2000-207791 | 7/2000 |
| JP | 2002-203343 | 7/2002 |
| JP | 2003-317336 | 11/2003 |

* cited by examiner

*Primary Examiner*—Paul W. Huber
(74) *Attorney, Agent, or Firm*—Fitzpatrick, Cella, Harper & Scinto

(57) ABSTRACT

There is provided a method of annealing an optical recording medium formed on a substrate having a land and a groove, comprising the steps of: annealing one side wall between the land and the groove with a predetermined laser power; moving the laser to another side wall by allowing the laser to traverse one of the land and the groove with a laser power for not annealing after the step of annealing is conducted; and annealing the another side wall with the laser power.

8 Claims, 10 Drawing Sheets

UNRECORDABLE REGION

METHOD OF ANNEALING OPTICAL RECORDING MEDIUM

BACKGROUND OF THE INVENTION

1. Field of the Invention

The present invention relates to an optical recording medium on/from which information is recorded or reproduced, and more particularly to a method of manufacturing an optical recording medium which requires an annealing treatment between information tracks.

2. Related Background Art

As a rewritable high-density recording system in a magnetooptical recording medium, there is a system in which a magnetic domain is written in a magnetic thin film by means of the thermal energy of a semiconductor laser to record information, and the information is read by using a magnetooptical effect. In recent years, a demand has increased that the recording density of the magnetooptical recording medium using that system be further increased to realize the large-capacity recording medium.

The linear recording density of the magnetooptical disk serving as a magnetooptical recording medium greatly depends on the laser wavelength of a reproducing optical system and the numerical aperture number of an objective lens. However, an improvement in the laser wavelength of the reproducing optical system and the numerical aperture number of the objective lens is limited. For that reason, there has been developed a technique of improving the recording density by devising the structure of the recording medium or a reading method.

For example, there is a technique disclosed in Japanese Patent Application Laid-Open No. H06-290496. According to this publication, in a structure of a multilayer film having a magnetic domain wall moving layer and a record holding layer which are magnetically coupled with each other, the information is recorded in the record holding layer. At the time of reproducing the information, the magnetic domain of a recording mark in the magnetic domain moving layer is moved by using a temperature gradient which is attributable to the irradiation of an optical beam without changing the information that has been recorded in the record holding layer. Then, the magnetic domain wall moving layer is magnetized so that a partial region of an optical beam spot has the same magnetization, and a change in an optical beam reflected light on a polarization plane is detected, thereby reproducing the recording mark of a light diffraction limit or lower.

This method makes it possible to realize a magnetooptical recording medium and a method of reproducing the magnetooptical recording medium which can reproduce the recording mark of the light diffraction limit or lower and remarkably improve the recording density and the transfer speed.

In the magnetooptical recording medium, in order to facilitate the movement of the magnetic domain of the recording mark in the magnetic domain moving layer by using the temperature gradient which is attributable to the irradiation of an optical beam, a laser beam of a high power is irradiated onto both of adjacent grooves between which an information recording and reproducing track is interposed to conduct a high temperature heating treatment on the groove (hereinafter referred to as "annealing treatment"). Thus, the annealing treatment that alters the recording medium layer of the groove portion is conducted. The annealing treatment makes it possible to obtain the effect that the magnetic domain wall which forms the recording mark does not become a closed magnetic domain. As a result, since coupling between the magnetic layers of the adjacent information tracks disappears, the movement of the magnetic domain wall is more stably moved. Through the annealing treatment, the excellent reproducing signal can be obtained.

However, in the above conventional example, in the case of assuming the annealing treatment, because the groove is annealed, there arises a problem in that only a land can be used as the information track, and it is difficult to achieve the high density.

Also, in recent years, to aim for the realization of the higher density, a study related to a magnetooptical disk that can use the land portion as well as the groove portion as the information track which requires no annealing treatment has been popularized. According to this study, the high density can be conducted perpendicularly with respect to the information track of the magnetooptical disk.

For example, in Japanese Patent Application Laid-Open No. H11-195252, there is realized a medium that can use not only the land portion but also the groove portion for recording (hereinafter referred to as "land/groove recording medium") by controlling the surface roughness of the groove side wall in a substrate.

In the above manner, conventionally, the tracks of the magnetooptical recording medium allow a narrow track pitch of up to about 0.5 μm. According to the experiment, the recording/reproducing of 0.08 μm/bit is realized as the linear recording density at a practical level by using the land/groove substrate having deep grooves (the groove depth is about 160 nm) with a track pitch of 0.54 μm. This corresponds to 15 Gbit/inch$^2$ as the recording density.

Also, in the case where recording can be performed on not only the land but also the groove, a relatively deep groove of about 100 nm or more is assumed. For that reason, temperature distributions that are produced at the time of tracing the land portion and at the time of tracing the groove portion are largely different from each other. In particular, a recording power that is relatively larger than that at the time of tracing the groove portion is required at the time of recording the land portion. Therefore, there arises a problem in that data on the groove portion is destroyed, that is, so-called cross-written when recording on the land portion is conducted with the optimum recording power.

Also, there arises a problem in that molding is difficult and the track pitch is difficult to narrow in the deep-groove substrate.

In view of the above circumstances, as a method of solving the above problems, the applicant (assignee) of the present invention has submitted a proposal that in order to use both of the land portions and the groove portions of the relatively shallow grooves as the tracks with a relative step between the land portions and the groove portions being about ⅛ or less of the light source wavelength related to the recording and reproducing, the lands and the grooves are magnetically divided through a method of altering the physicality of boundary portions (hereinafter referred to as "side walls") between the lands and the grooves through the annealing treatment of the laser beam irradiation in advance.

According to the above method, it is possible to provide the magnetooptical recording medium that can perform higher density information recording of the narrower track pitches, which corresponds to the land/groove recording using the shallower groove having tracks magnetically divided in the radial direction of the recording medium.

In annealing the side walls between the lands and the grooves, there has been studied a simple and high-efficient method. In view of the above circumstances, as a result of studying the above annealing treatment earnestly, the applicant (assignee) of the present invention has found out the following fact. That is, after a certain side wall is annealed with a laser power for annealing in order to anneal another side wall adjacent to the side wall, the side wall is annealed after traversing a track with the laser power for annealing as it is (called "track jump"). In this case, the region that has been annealed at the time of traversing the track is formed in the information recording track, that is, the land portion or the groove portion. For that reason, the applicant of the present invention has apprehended a problem in that a region where no recording magnetic domain is formed in the information track occurs, reducing an effective recording region.

SUMMARY OF THE INVENTION

The present invention has been made in view of the above circumstances, and therefore an object of the present invention is to provide a method of annealing an optical recording medium in which no annealed region exists in an information track serving as a recording and reproducing region.

The annealing method according to the present invention is as follows.

According to an aspect of the present invention, there is provided a method of annealing an optical recording medium formed on a substrate having a land and a groove, comprising the steps of: annealing one side wall between the land and the groove with a predetermined laser power; moving the laser to another side wall by allowing the laser to traverse one of the land and the groove with a laser power for not annealing after the step of annealing is conducted; and annealing the another side wall with the laser power.

BRIEF DESCRIPTION OF THE DRAWINGS

FIGS. 2A and 2B are diagrams showing the arrangement of a spot on a magnetooptical disk at the time of annealing, in which FIG. 2A is a plan view showing a plane onto which an optical beam for annealing is irradiated, and FIG. 2B is a cross-sectional view taken along a line 2B-2B;

DESCRIPTION OF THE PREFERRED EMBODIMENTS

First Embodiment

Hereinafter, a description will be given in detail of embodiments of the present invention with reference to the accompanying drawings. The following embodiments show examples, and the present invention is not restricted by those embodiments.

An example of a magnetooptical disk that is used in the present invention will be described. The magnetooptical disk is shown in a partial cross-sectional view of FIG. 1.

Figure 1:
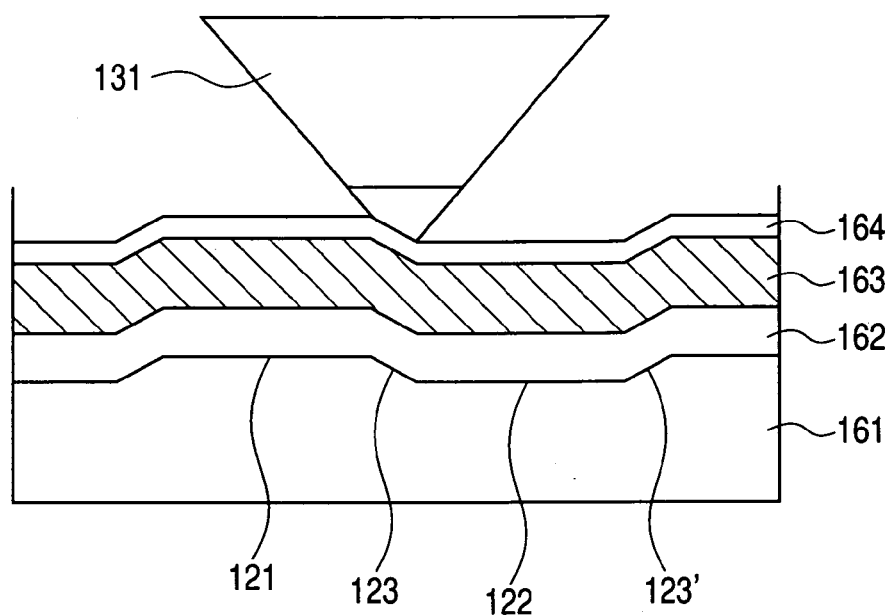
FIG. 1 is a schematic drawing showing an appearance of a disk section at the time of annealing.

Referring to FIG. 1, the magnetooptical disk is comprised of a substrate 161, a recording layer 163 that is disposed above the substrate 161, a first dielectric layer 162 that is disposed between the substrate 161 and the recording layer 163, a second dielectric layer 164 that is disposed at an opposite side of the substrate 161 with respect to the recording layer 163, and a protective coating layer (not shown) that is disposed on a second dielectric layer 164. The magnetooptical disk performs the reproducing of an information signal by using a light that is input from the substrate 161 side.

For that reason, the substrate 161 is a disk substrate. The substrate 161 can be made of polycarbonate or glass, and is about 0.5 mm to 1.2 mm in thickness.

The first dielectric layer 162 and the second dielectric layer 164 can be made of silicon nitride such as $Si_3N_4$, or a transparent dielectric material such as AlN, $SiO_2$, SiO, ZnS, or $MgF_2$.

The thickness of the second dielectric layer 164 is set such that the reflectivity is low and a light can be efficiently absorbed when the laser beam for annealing is irradiated from the second dielectric layer 164 side as disclosed in Japanese Patent Application Laid-Open No. 2002-203343. Also, in the magnetooptical disk disclosed in Japanese Patent Application Laid-Open No. 2002-203343, the substantial width of the recording track can be widened because an optical spot of the laser beam for annealing can be reduced. Also, since the absorption efficiency of the laser beam for annealing in the recording layer 163 can be enhanced, the optical spot can be scanned at a high linear speed, and the annealing period of time can be reduced.

More specifically, in the case where silicon nitride that is about 2 in the refractive index is used as the second dielectric layer 164, and a wavelength λ of the laser beam for annealing is in a range of 400 nm to 410 nm, the thickness of the second dielectric layer 164 can be set in a range of 20 nm to 60 nm.

The protective coating layer (not shown) can be made of the same material as that of the substrate 161, but is preferably larger in the refractive index than the substrate 161. The protective coating layer may be formed by coating and hardening ultraviolet curing resin, or may be formed by bonding a substrate on the second dielectric layer 164.

The recording layer 163 includes three or more magnetic layers so as to enable reproducing through a domain wall displacement detection (DWDD) system. The recording layer 163 at a side wall 123 that is formed between a land 121 and a groove 122 is a layer that has been annealed by using a light of the wavelength λ that has been input from the second dielectric layer 164 side. Side wall 123' is a side wall which is one of the side walls in contact with the groove 122 and is different from the side wall 123. As one example of the recording layer 163, in the case where the recording layer 163 includes a magnetic domain wall moving layer that is a first magnetic layer, a switching layer that is a second magnetic layer and a record holding layer that is a third magnetic layer, which are stacked from the substrate 161 side (at a side where the recording and reproducing spots (not shown) are arranged) in the stated order, the respective layers can be made of the following materials.

The first magnetic layer can be made of a material that has a small magnetic domain wall coercivity, is small in the saturation magnetization at a temperature range close to the Curie temperature of the second magnetic layer, and is lower than the third magnetic layer but higher than the second magnetic layer in the Curie temperature. For example, the first magnetic layer can be made of GdCo, GdFeCo or an alloy thereof whose Curie temperature is about 220° C. to 300° C.

The second magnetic layer is preferably made of a material that is lower in the Curie temperature than the first magnetic layer and the third magnetic layer, and has a magnetic domain wall coercivity that is larger till just the Curie temperature. For example, the second magnetic layer can be made of DyFe, TbFe or an alloy thereof whose typical Curie temperature is 140° C. to 180° C.

The third magnetic layer can be made of a material that has a large magnetic domain wall coercivity, has a Curie temperature higher than that of the first magnetic layer and the second magnetic layer, and is small in the saturation magnetization at a temperature range close to the Curie temperature of the second magnetic layer. For example, the third magnetic layer can be made of TbFeCo or an alloy thereof which is 280° C. to 330° C. in the Curie temperature. As disclosed in Japanese Patent Application Laid-Open No. 2000-207791, in order to improve the characteristic at the time of reproducing, a blockade auxiliary layer may be provided. In addition, as disclosed in Japanese Patent Application Laid-Open No. 2000-187898, a magnetic layer may be provided for preventing the magnetic domain wall from the back from moving forward and being confused into the reproducing signal.

The magnetooptical disk according to the present invention may further include a heat conduction adjusting layer for adjusting the sensitivity of the recording layer 163 between the second dielectric layer 164 and the protective coating layer (not shown). The heat conduction adjusting layer can be formed of a metal film, for example, a film made of aluminum or gold. The thickness of the heat conduction adjusting layer is generally about 50 nm to 500 nm. In this case, the heat conduction adjusting layer is formed after conducting the annealing treatment.

Also, the annealing treatment is conducted by using three beam lights having a main beam and two sub-beams as proposed in Japanese Patent Application No. 2002-122431. A land and a groove adjacent to the land are subjected to tracking by the sub-beams, and the main beam is irradiated onto a side wall portion between the adjacent land and groove. It is desirable that the laser beam have a shorter wavelength such as 400 to 420 nm in order to narrow the width of the annealing treatment region in a tracking direction (that is, a direction perpendicular to the track).

In this situation, tracking is conducted in such a manner that the main beam is irradiated onto the side wall (for example, the side wall 123) at the disk inner periphery side of a predetermined annealing region of the magnetooptical disk with a lower laser power for not conducting the annealing treatment. The linear speed of the magnetooptical disk at that time is appropriately selected according to the thickness or material of the medium. In general, the linear speed of the magnetooptical disk is 1.5 to 6.0 m/s. Then, in order to uniformly conduct the annealing treatment, the annealing treatment is conducted at a constant linear speed. Thereafter, a laser power for conducting the predetermined annealing treatment is selected, and only the side walls at the disk inner peripheral side (side walls at the one side, for example, the side wall 123) are first continuously annealed over an entire predetermined region. Thereafter, the laser power is decreased to a power for not annealing. Seek is conducted in a state of the lower laser power, and the main beam is so moved as to be irradiated onto the non-annealed side wall (for example, the side wall 123') on which the predetermined annealing treatment starts. Thereafter, the laser power is increased to a laser power for conducting the predetermined annealing treatment, and the non-annealed side wall 123' is annealed over the entire predetermined region.

Alternatively, after the side wall 123 at one side of a certain information track is annealed for a predetermined length (normally one round), the laser power is decreased to a power for not conducting the annealing treatment, and the main beam is moved to the adjacent side wall 123'. Thereafter, the laser power is increased to a laser power for conducting the predetermined annealing treatment, and the adjacent side wall 123' is annealed. After the side wall 123' has been annealed for the predetermined length, the laser power is set to the lower laser power, and the main beam is moved to the adjacent side wall 123. The operation may be repeated to anneal the entire predetermined region.

Figures 2A, 2B:
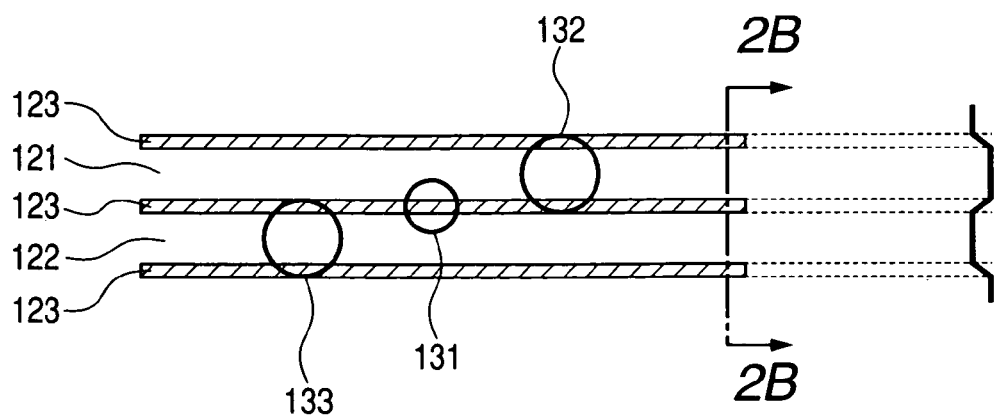

The above treatment methods, that is, whether the entire side wall should be annealed or the annealing treatment for a predetermined length is repeated is determined taking the productivity, the costs, or the tact into consideration. FIGS. 2A and 2B show an appearance of the laser beam in the above-mentioned annealing treatment. In the figure, reference numerals 132 and 133 denote sub-beams, and the same numerals as those in FIG. 1 represent identical parts.

In the above manner, since the main beam is moved on the information track with the laser power for not conducting the annealing treatment, no annealed region occurs in the information track. As a result, an excellent characteristic (characteristic where the lands and the grooves are magnetically excellently separated) is exhibited in all the region that have been annealed, and the information tracks having a desired recording and reproducing characteristic are obtained over the entire predetermined regions.

Hereinafter, a description will be given in more detail of preferred embodiments, but the present invention is not limited to the following embodiments with the scope of-the present invention.

EXAMPLE 1

A description will be given of an example in which a recording medium that has been proposed in Japanese Patent Application Laid-Open No. 2000-207791 and Japanese Patent Application Laid-Open No. 2000-187898 is applied to a medium that has been proposed in Japanese Patent Application Laid-Open No. H06-290496 according to a manufacturing method of the present invention. In this case, the recording layer 163 was made of a magnetic multilayer film where first to fifth magnetic layers were sequentially stacked on the substrate 161. The first magnetic layer and the second magnetic layer were made of a magnetic film that was relatively smaller than the fifth magnetic layer in the magnetic domain wall coercivity at a temperature range close to an ambient temperature. The fourth magnetic layer was made of a magnetic film that was lower in the Curie temperature than the first, second, third, and fifth magnetic layers, and the fifth magnetic layer was made of a vertical magnetized film. The substrate 161 was made of polycarbonate which was 64 mm in diameter and 0.6 mm in thickness. In the substrate 161, pitches between the lands and the grooves which were double-spirally formed were set to 0.55 μm, pitches between only the grooves or lands were set to 1.1 μm, and steps (depths) were set to 0.04 μm. The gradient angle of the side wall between the land and the groove with respect to the substrate surface was set to about 40°. The pattern region of the lands and the grooves was 16 mm to 30 mm in radius. Each target of Si doped with B, Gd, Tb, Fe, and Co was attached onto a d.c. magnetron sputtering device, and the polycarbonate substrate was fixed to a substrate holder. Thereafter, the inside of the chamber was evacuated from a chamber by a cryopump so as to provide high vacuum of $1\times10^{-5}$ Pa or less. A sputtering gas was introduced into the chamber, and an SiN layer that was the first dielectric layer 162 was formed in thickness of 40 nm while rotating the substrate 161. Subsequently, a GdFeCo layer was formed in the thickness of 18 nm as the first magnetic layer, a GdFeCr layer was formed in the thickness of 18 nm as the second magnetic layer (blockage auxiliary layer), a TbFeCo layer was formed in the thickness of 18 nm as the third magnetic layer (backward confusion preventive layer), a TbFe layer was formed in the thickness of 10 nm as the fourth magnetic layer (blockage layer), and a TbFeCo layer was formed in the thickness of 60 nm as the fifth magnetic layer (memory layer), sequentially. Finally, an SiN layer was formed in the thickness of 45 nm as the second dielectric layer 164. At the time of forming the SiN layer, an $N_2$ gas was introduced in addition to the Ar gas, and the SiN layer was formed through the d.c. reactive sputtering. The respective magnetic layers were formed by supplying a d.c. power to the respective targets of Gd, Tb, Fe, and Co by using the Ar gas.

The Curie temperatures of the respective magnetic layers were set to 300° C. or higher in the first magnetic layer, about 220° C. in the second magnetic layer, about 180° C. in the third magnetic layer, about 160° C. in the fourth magnetic layer, and about 330° C. in the fifth magnetic layer. The compositions of the respective magnetic layers were adjusted to compositions that were excellent in the characteristic. Thereafter, the annealing treatment was conducted from the second dielectric layer 164 side by means of a three-beam annealing device of 405 nm in the laser wavelength. The linear speed at the time of annealing was constantly 4.5 m/s. Also, the anneal power of the main beam was 5.0 mw. The anneal conditions could be obtained by conducting the recording and reproducing evaluations while changing the anneal power in advance. The power of the main beam on standby or at the time of traversing the tracks was set to 1.5 mw.

First, tracking was made so that the main beam was irradiated onto the side wall of the inner periphery side of the land portion of the disk innermost periphery. The laser power at this time was 1.5 mw. Thereafter, the laser power was set to 5.0 mw, and the main beam was consecutively irradiated onto the side walls of the inner peripheries of the respective land portions. Since the lands and the grooves were spirally formed, the side walls of the inner peripheries at the respective land portions were consecutively annealed toward the outermost periphery in a state where tracking was effected. When the main beam reached the outermost periphery, the laser power dropped down to 1.5 mw that was the standby power, and the optical head was again moved to the innermost periphery to jump the tracks to the non-annealed side wall. Thereafter, the laser power was set to 5.0 mw, and the side walls of the outer periphery sides of the land portions were consecutively annealed in the same manner as the above. After the main beam reached the outermost periphery, the laser power dropped down to 1.5 mw that was the standby power, and the annealing treatment was completed. Thereafter, the ultraviolet curing resin was coated to produce the information recording medium according to the present invention.

COMPARATIVE EXAMPLE 1

In the medium of Example 1, the side walls that were adjacent to the respective information tracks were alternately annealed while jumping the tracks from the innermost periphery toward the outermost periphery of the magnetooptical disk while the laser power was not decreased at the time of annealing. Thereafter, the ultraviolet curing resin was coated on the medium in the same manner as that in the first embodiment to produce the medium of the first comparative example.

Figure 3:
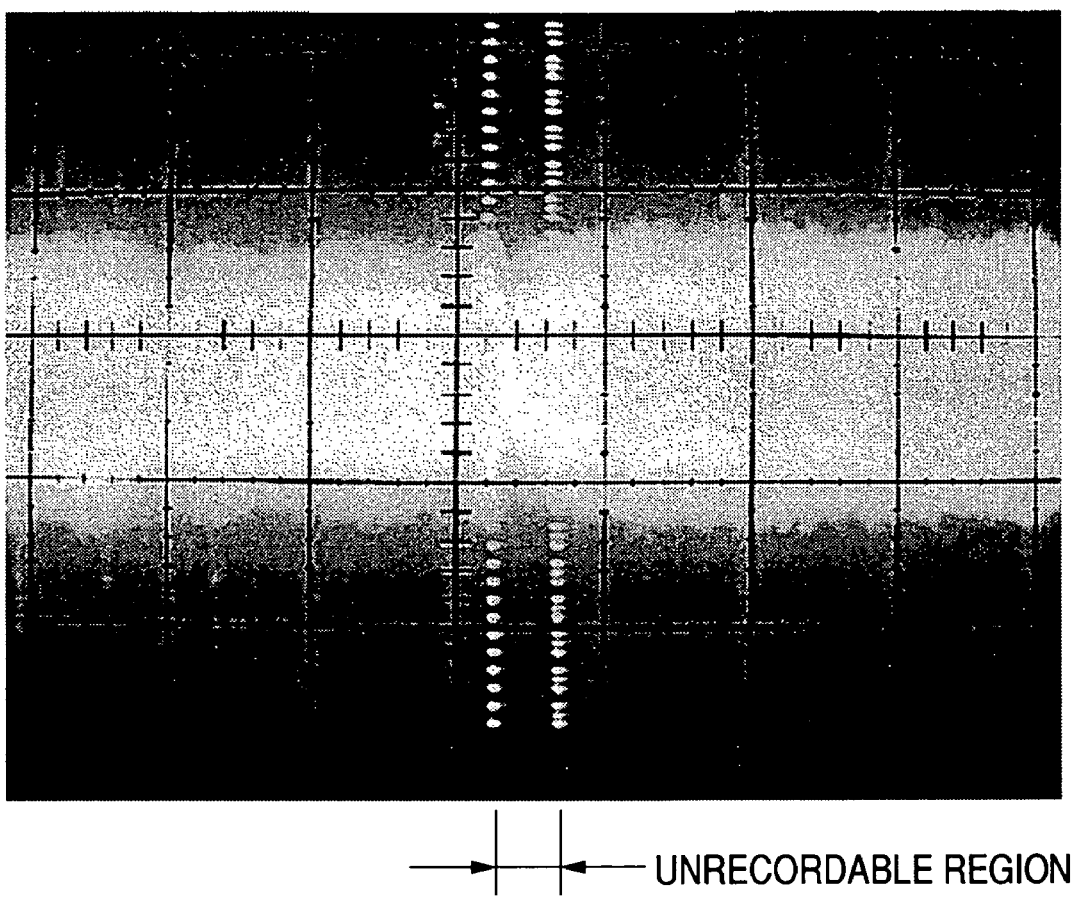
FIG. 3 is a waveform diagram showing an MO reproducing signal of an information track region that has been annealed by track jump.

In the media of Example 1 and Comparative Example 1, the recording and reproducing evaluation was conducted under the following conditions. The medium was set in a driving device having an optical head that was 650 nm in the laser wavelength and 0.60 in the objective lens NA, and rotated at a constant linear speed of 2.4 m/s. Then, the recording characteristic was measured at the position of the radius 22 mm. While a magnetic field was modified by a slidable magnetic head, a recording DC laser was irradiated onto the lands, and a repetitive pattern having the mark length of 0.11 μm was recorded by modifying the magnetic field. The signal was reproduced by the reproducing power 2.5 mW, and an MO signal was observed over one round by an oscilloscope. As a result, in Comparative Example 1, a region that was insufficient in the reproduced MO signal amplitude was observed as shown in FIG. 3. The length of the defect was 425 n s, and the length of one bit was 22.22 n s. Therefore, the MO signal corresponded to about 19,000 bits. The number of bytes in that region corresponded to about 2.3 KB. In the case of the format in which 1 sector equals 32 KB, when a defective region of about 2 KB exists in the one sector, the sector becomes an unusable defective sector. In the case of a format having 16 sectors in one round, 1/16 of one round cannot be used implicitly. When the entire capacity of the disk is 4.7 GB, about 0.29 GB cannot be used. This is about 6% of the entire capacity. However, in the medium of the present invention, the defect shown in FIG. 3 was not found, and no defective sector attributable to the annealing process existed.

Second Embodiment

In this embodiment, the offset at the time of annealing treatment is further taken into consideration. First, a problem related to the offset will be described in detail. A description will be given of an example in which after a side wall (hereinafter referred to as "side wall B") directed toward the outer periphery side is annealed from the inner peripheral side toward the outer peripheral side, the side wall (hereinafter referred to as "side wall A") directed toward the inner peripheral side is annealed from the inner periphery side toward the outer periphery side. However, the present invention is not limited to this structure.

First, the side wall B at the innermost periphery is tracked through the same three-beam method as that in the first embodiment, and the side wall B is consecutively annealed from the inner periphery toward the outer periphery. Upon completion of the annealing treatment at the side wall B, the laser power drops once, and the laser beam is moved to the side wall A at the innermost periphery. In this situation, the polarity of a tracking error signal is changed over according to the inversion of the gradient of the tracking error, and tracking is effected. Thus, the side wall A is consecutively annealed from the inner periphery toward the outer periphery. Here, in the conventional annealing method using the three-beam method, the push-pull tracking error signal at the time of annealing as described above has an unnecessary offset as compared with the region (non-annealed region) where the adjacent side walls are not annealed. It is presumed that the offset is caused by a change in the amount of reflected light from the region that has been annealed.

Then, an example in which the amount of reflected light is decreased due to the annealing treatment will be described. Also, an example in which the track offset amount is zero in the non-annealed region will be described.

Figure 7:
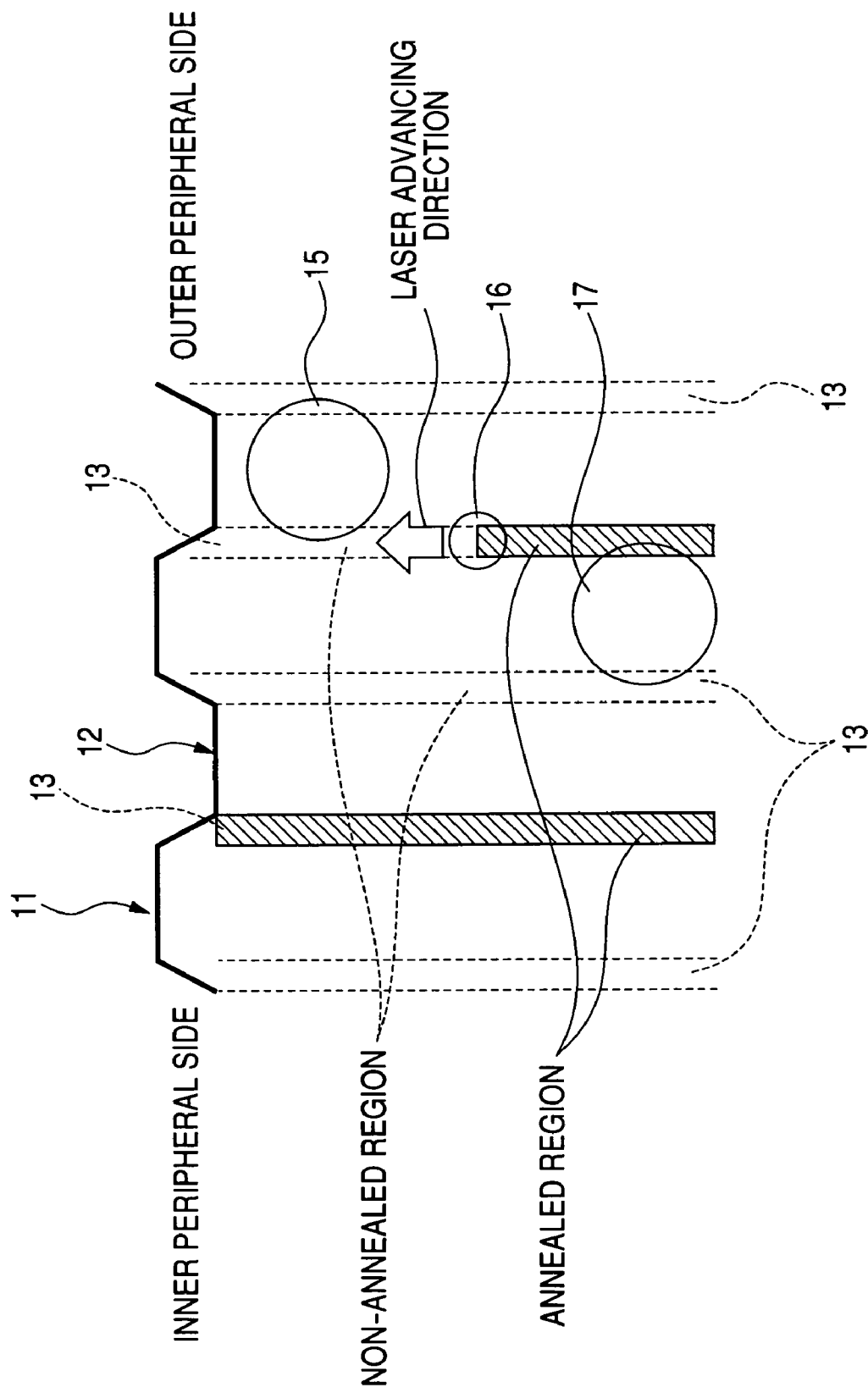
FIG. 7 is a plan view showing a spot arrangement at the time of annealing an outer peripheral side wall B with respect to a land.
Figure 8A:
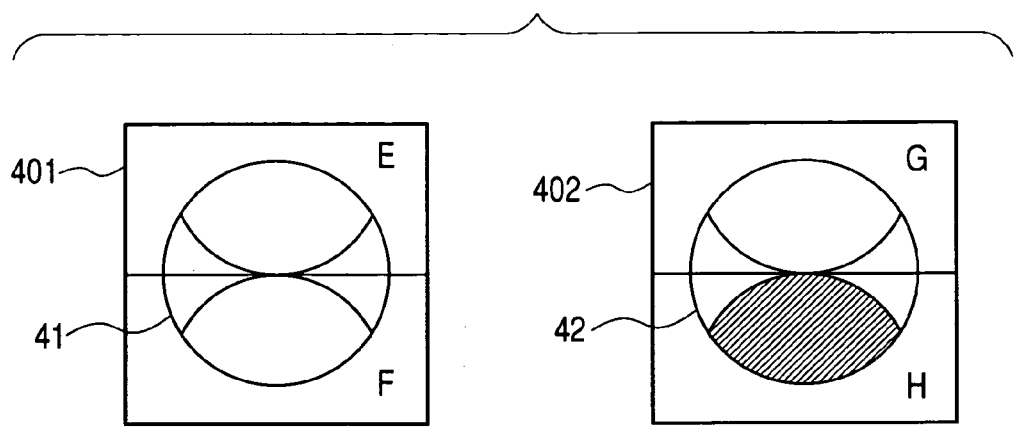
FIGS. 8A and 8B are diagrams for explaining a spot on a sensor which corresponds to a sub-beam at the time of annealing the side wall B, and a tracking error signal and a push-pull tracking error signal which are attributable to the sub-beam in that case.
Figure 8B:
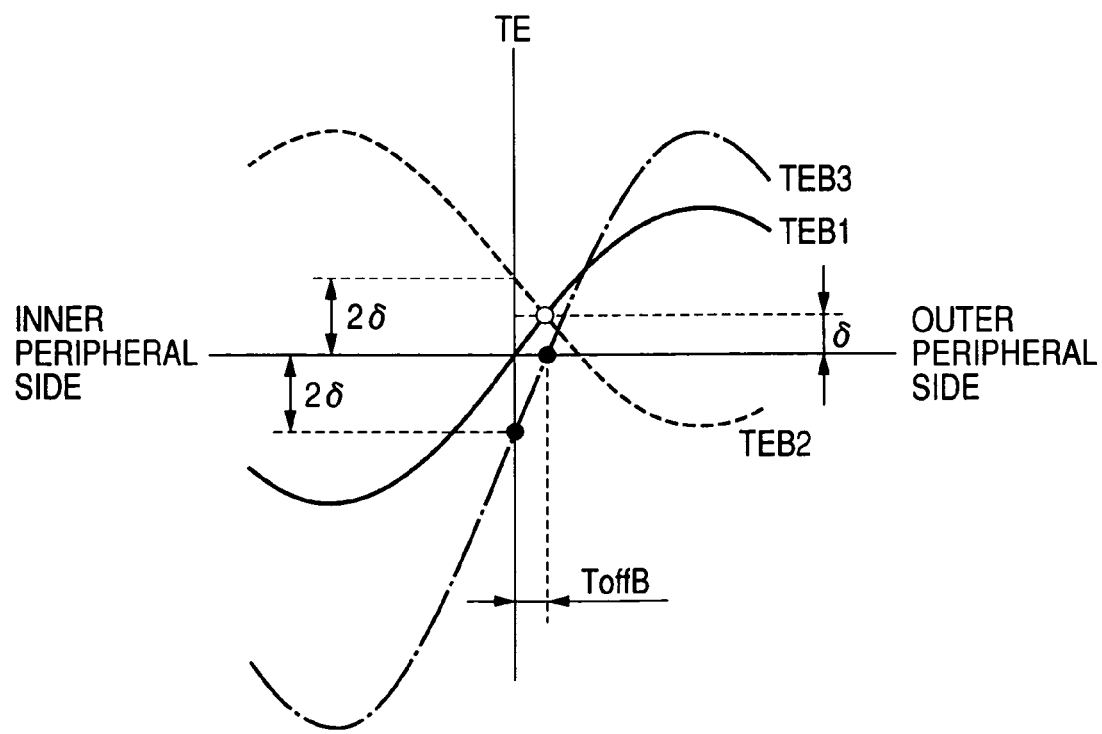

Description of B Side:

FIG. 7 shows a plan view showing the arrangement of an optical beam at the time of annealing the side wall B of the outer peripheral side with respect to the land. Also, FIG. 8A is a diagram showing spots 41 and 42 corresponding to the sub-beams 15 and 17 which are condensed on the sensors 401 and 402 at the time of annealing the side wall B. FIG. 8B is a diagram for explaining a tracking error signal TEB1 (differential output of sensor outputs E and F, which will be explained in detail later) due to the sub-beam 15, a tracking error signal TEB2 (differential output of sensor outputs G and H) due to the sub-beam 17, and a push-pull tracking error signal TEB3 (TEB1-TEB2) at the time of annealing the side wall B. The axis of abscissa represents a position, an inner peripheral side, and an outer peripheral side on the substrate.

Since the sub-beam 17 that is on the back of the main beam in the laser beam advancing direction is affected by the annealed region from only the side wall B side, the amount of light at an H side of the sensor 42 is decreased, the TEB2 is offset $+2\delta$. The sub-beam 15 that is in front of the main beam is not affected by the annealed region, and the TEB1 is not also affected. As a result, the push-pull tracking error signal TEB3 is offset $-2\delta$.

For that reason, the main beam 16 is displaced toward the outer peripheral side by ToffB as shown in FIG. 8B. Here, since tracking is effected when the TEB3 becomes 0 (initial set value) while the annealing treatment is conducted, $-2\delta$ cannot be detected even if the TEB3 is monitored. It is necessary to monitor the tracking error signal of the sub-beam in detection of $\delta$. In this situation, the tracking error signal that is offset by $+\delta$ is obtained from the TEB1 and the TEB2. Reference numeral 11 denotes a land, 12 denotes a groove and 13 denotes a side wall.

Figure 9:
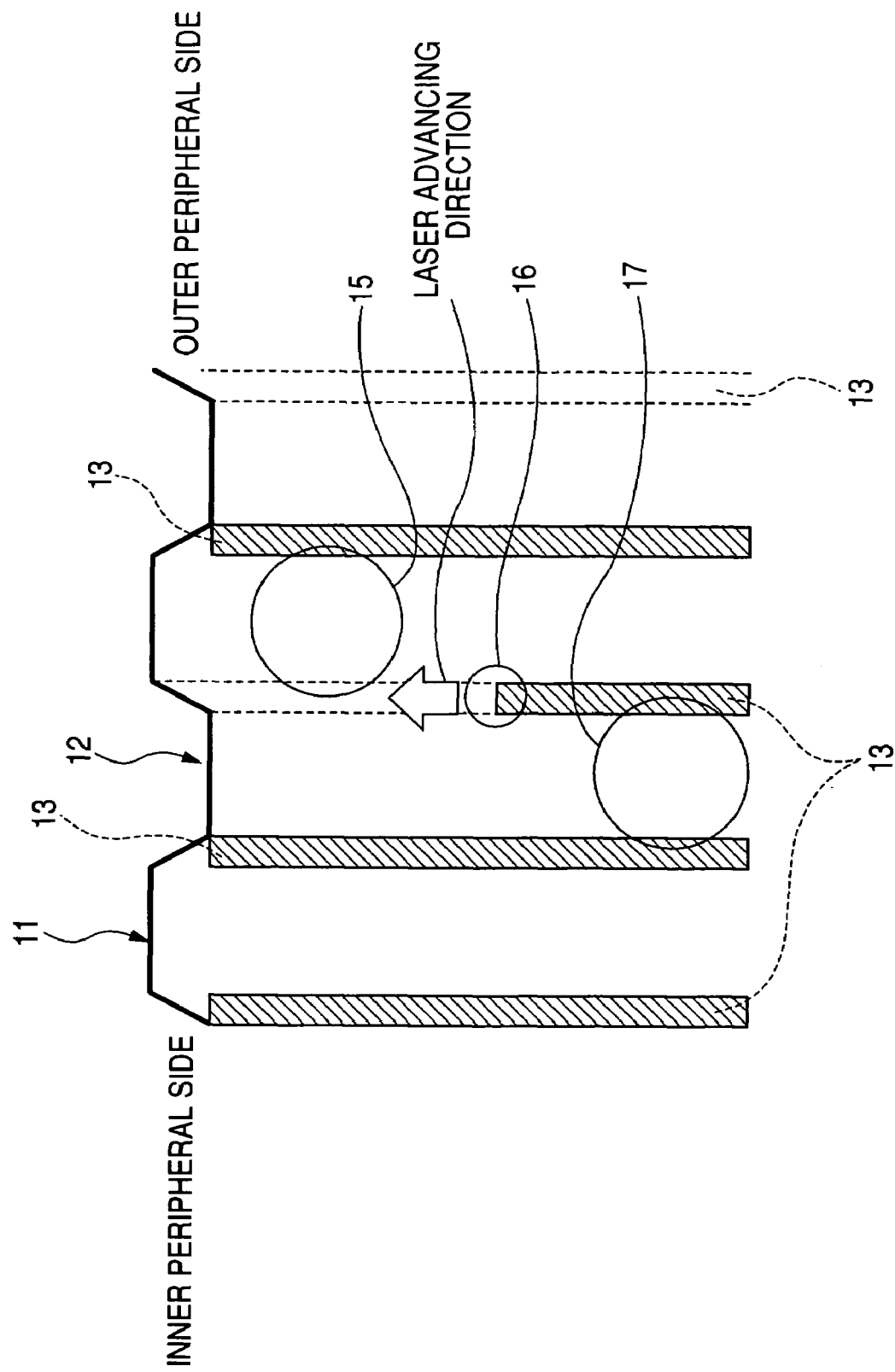
FIG. 9 is a plan view showing the spot arrangement at the time of annealing an outer peripheral side wall A with respect to the land after the side wall B has been annealed.
Figure 10A:
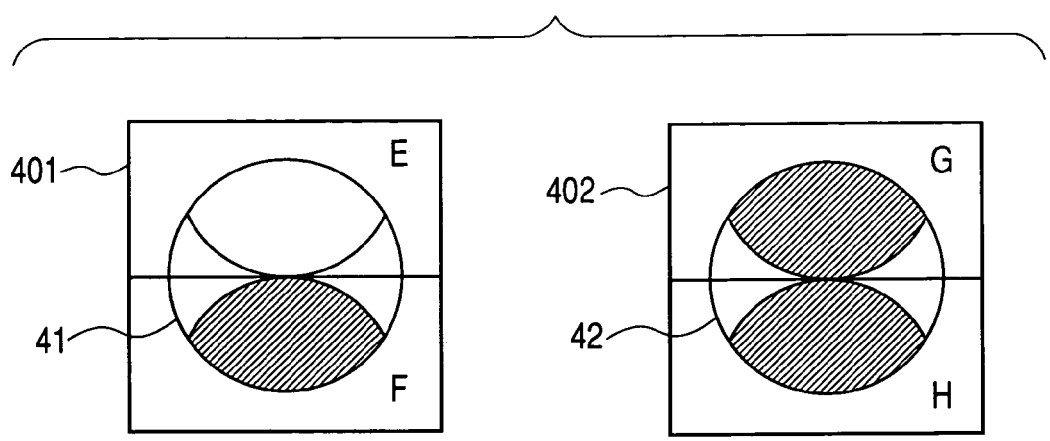
FIGS. 10A and 10B are diagrams for explaining spots on the sensor which corresponds to the sub-beam at the time of annealing the side wall A after the side wall B has been annealed, and a tracking error signal and a push-pull tracking error signal which are attributable to the sub-beam in that case.
Figure 10B:
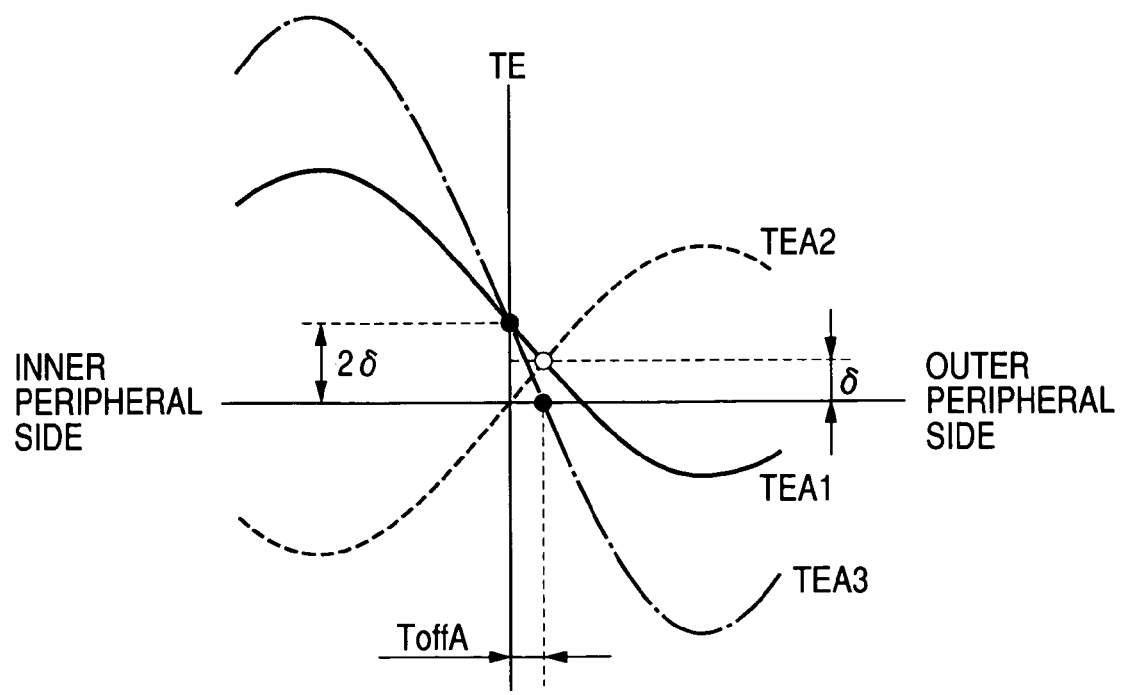

Description of the A Side:

FIG. 9 is a plan view showing the arrangement of the optical beam at the time of annealing the side wall A of the inner peripheral side with respect to the land after the side wall B has been annealed. The same numerals as those in FIG. 7 designate identical members. Also, FIG. 10A is a diagram showing spots 41 and 42 corresponding to the sub-beams 15 and 17 which are condensed on the sensors 401 and 402 at the time of annealing the side wall A after the side wall B has been annealed. FIG. 10B is a diagram for explaining a tracking error signal TEA1 (differential output of sensor outputs E and F, which will be explained in detail later) due to the sub-beam 15, a tracking error signal TEA2 (differential output of sensor outputs G and H) due to the sub-beam 17, and a push-pull tracking error signal TEA3 (TEA1-TEA2) at the time of annealing the side wall A after the side wall B has been annealed. The axis of abscissa represents a position, an inner peripheral side, and an outer peripheral side on the substrate.

Since the sub-beam 17 that is on the back of the main beam in the laser beam advancing direction is affected by the annealed region from both sides of the side wall B and the side wall A, the amount of light at both of the G side and the H side of the sensor 42 is decreased, and the TEA2 is not offset. Since the sub-beam 15 that is in front of the main beam is affected by the annealed region from only the side wall B side, the amount of light at the F side of the sensor 41 is decreased, and the TEA1 is offset $+2\delta$. As a result, the push-pull tracking error signal TEA3 is offset $+2\delta$.

For that reason, the main beam 16 is displaced toward the outer peripheral side by ToffA as shown in FIG. 10B. Here, since tracking is effected when the TEA3 becomes 0 (initial set value) while the annealing treatment is conducted, $+2\delta$ cannot be detected even if the TEA3 is monitored. It is necessary to monitor the tracking error signal of the sub-beam in detection of $\delta$. In this situation, the tracking error signal that is offset by $+\delta$ is obtained from the TEA1 and the TEA2.

From the above description, it is understood that an electric offset having an opposite symbol occurs in the push-pull tracking error signal between the side wall B and the side wall A, that is, the side wall that is subjected to the laser annealing treatment first and the side wall that is subjected to the laser annealing treatment next. For that reason, in the conventional annealing method, offset occurs in the same direction with respect to the inner and outer peripheral directions even in the case where the position of the main beam is at any side wall.

Figure 4:
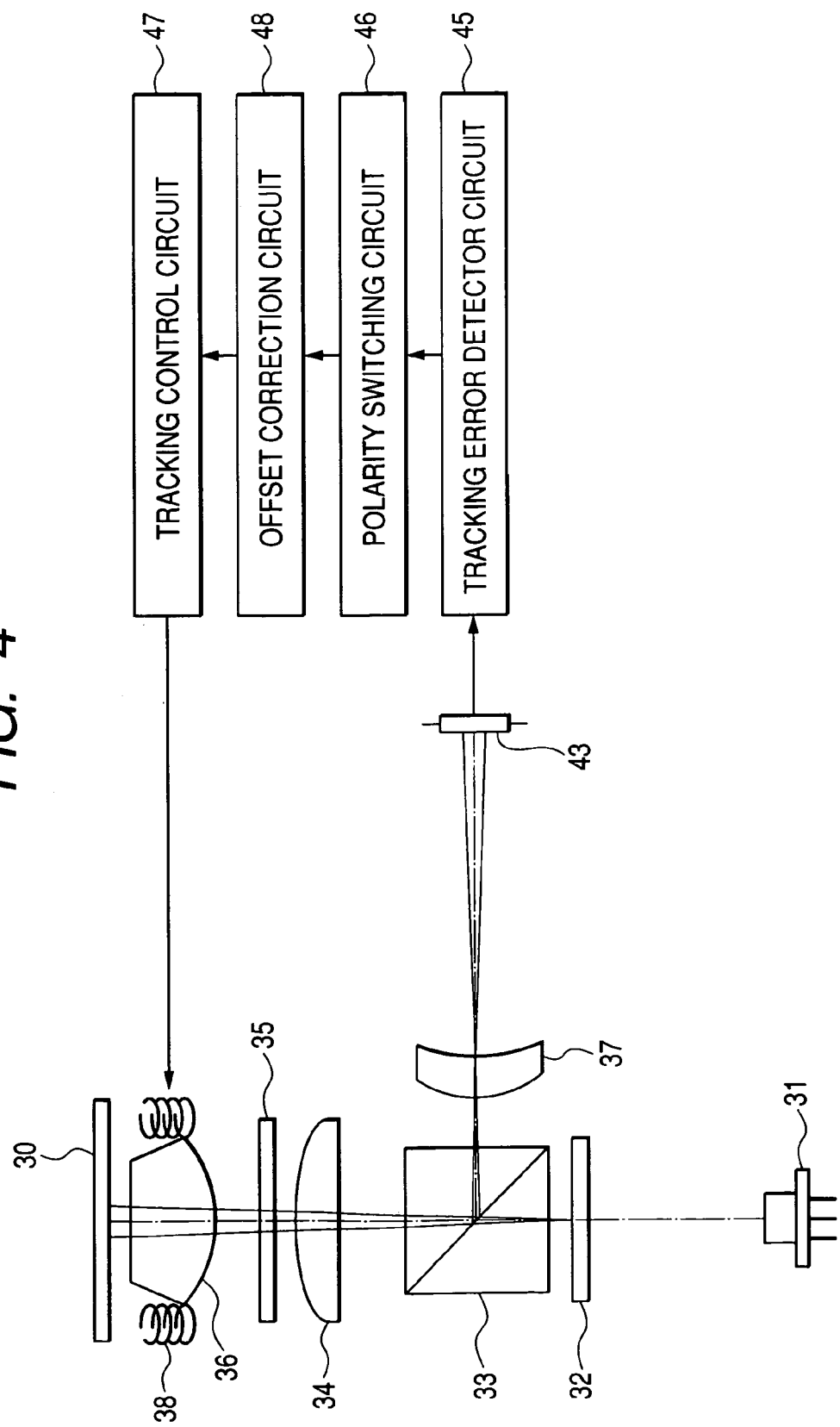
FIG. 4 is a structural diagram showing an annealing device in a second embodiment of the present invention.

FIG. 4 is a structural diagram showing the annealing device used in this embodiment. A light beam from the semiconductor laser 31 is divided into three beams consisting of a light beam that is not diffracted by a grating 32 and two light beams which are ±primary diffracted lights of the grating 32. Those three light beams become substantially in parallel with each other by a collimator 34 after passing through a polarizing beam splitter (PBS) 33, and then condensed on the magnetooptical recording medium 30 by an objective lens 36 through a ¼ wavelength plate 35. In this situation, the main beam 16 and the two sub-beams 15 and 17 are condensed on the magnetooptical recording medium 30 as shown in FIG. 7.

Here, in order to obtain a fine spot (main beam 16) with a high intensity, for example, the wavelength of the semiconductor laser 31 is set to 405 nm as described above, and the objective lens 36 adopts NA=0.85. The intensity of the light source is set to an optimum value under the condition where the intensity of the main beam 16 is about 4 to 7 mW at the rotational speed of 1.5 to 6 m/s of the magnetooptical recording medium 30.

Those three beams that are reflected from the magnetooptical recording medium 30 are reflected by the PBS 33 and then condensed to a sensor 43 by a sensor lens 37. A tracking error detector circuit 45 is constituted by a circuit shown in FIG. 11 as will be described later, and a tracking error signal (TE) is detected from the tracking error signal obtained from the sensor 43. A polarity switching circuit 46 changes over the polarity of the tracking error signal, and a tracking control circuit 47 controls an actuator 38 and conducts tracking control. Then, the tracking control circuit 47 conducts the annealing treatment on a side wall 13 by the main beam 16. The offset correction circuit 48 corrects the offset of the tracking error signal.

Figure 11:
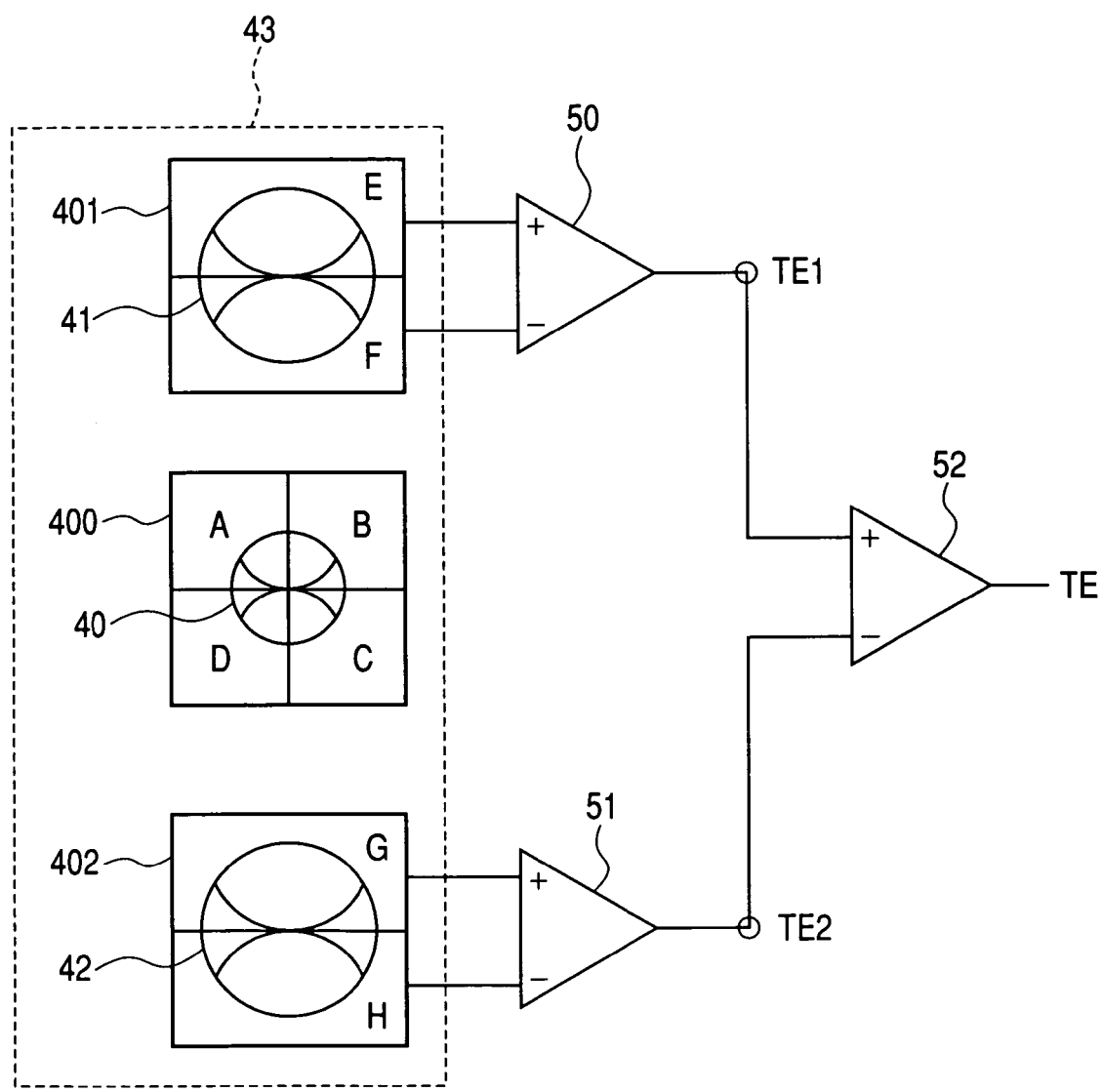
FIG. 11 is a circuit diagram showing a tracking error detector circuit.

The details of the tracking error detector circuit 45 are constituted by a circuit shown in FIG. 11. In FIG. 11, the sensor 43 is made of three groups of divided sensors 400, 401, and 402, and the reflected spots 40, 41, and 42 which are attributable to sub-beam 15, the main beam 16, and the sub-beam 17 on the magnetooptical recording medium 30 are condensed on the respective divided sensors.

Here, it is assumed that the outputs of the divided sensor 400 in FIG. 11 are A, B, C, and D, the outputs of the divided sensor 401 are E and F and the outputs of the divided sensor 402 are G and H. Also, reference numerals 50 to 52 denote differential amplifiers used for calculation for generating the tracking error signal (TE).

First, the calculation of (A+C)−(B+D) is conducted by using the divided sensor 400 to obtain the focus error signal. A calculation circuit for obtaining the focus error signal is not shown.

On the other hand, the calculation of TE1=E−F, TE2=G−H is conducted by the differential amplifiers 50 and 51 by using the outputs of the divided sensors 401 and 402 to obtain the push-pull tracking error signals TE1 and TE2. In addition, the calculation of TE=TE1−TE2 is conducted by the differential amplifier 52 to obtain the tracking error signal TE. Thus, when the known differential push-pull method is applied to the sub-beams 15 and 17, that is, the corresponding spots 41 and 42, the tracking error signal that suppresses the DC offset component is obtained.

The tracking control is conducted by using the tracking error signal thus obtained to enable the tracking servo that is stable at the time of annealing the side wall 13. The tracking servo is thus effected on the basis of the tracking error signal TE, and in the case where the main beam is moved from a side wall directed toward the outer peripheral side to another side wall directed toward the inner peripheral side, the polarity of the TE changes over to effect the tracking servo.

Figure 5:
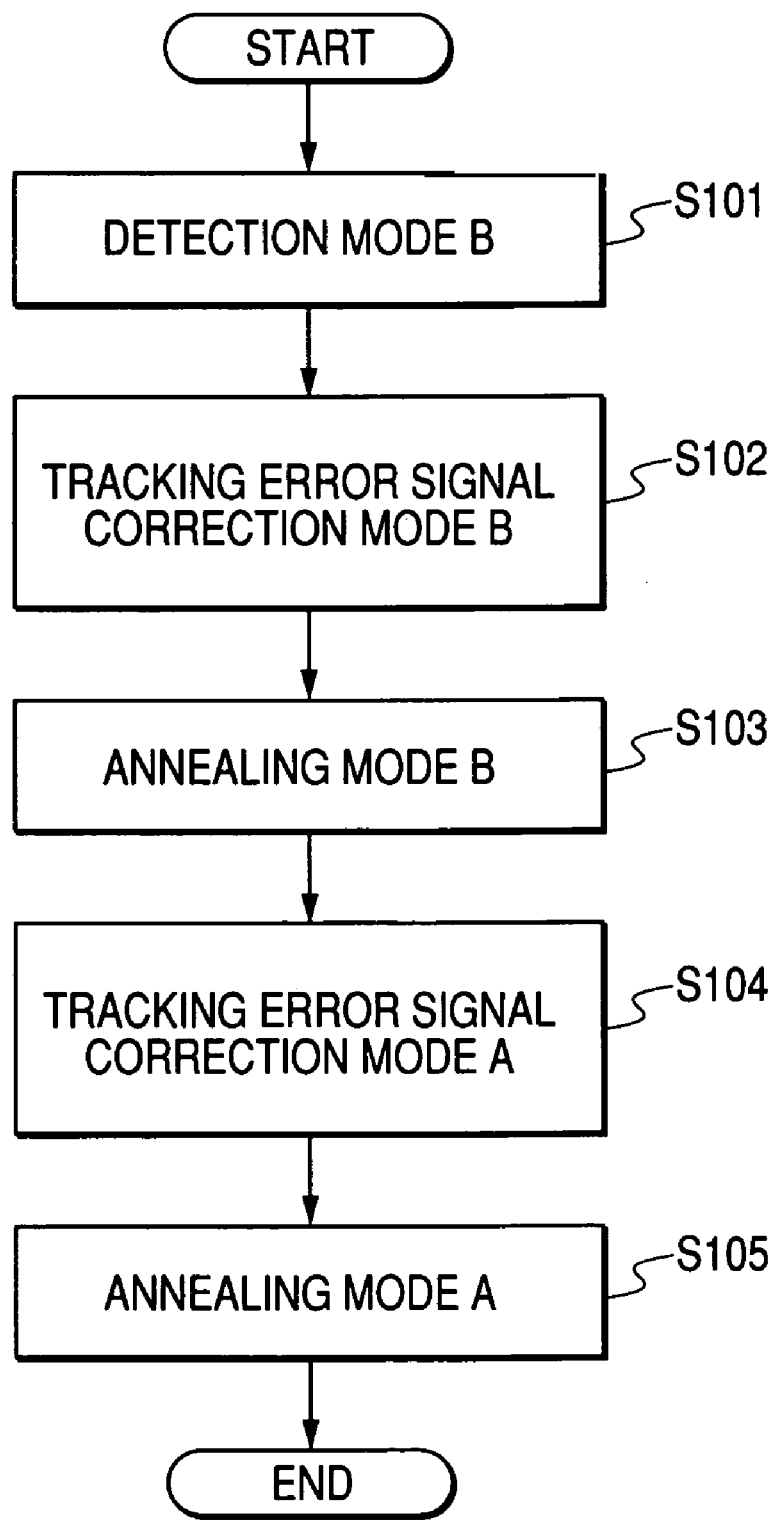
FIG. 5 is a flowchart showing an annealing procedure of the annealing device shown in FIG. 4.

FIG. 5 is a flowchart showing a series of flows of annealing treatment by the device shown in FIG. 4. First, a non-annealed region of the innermost periphery of the magnetooptical recording medium 30 is irradiated with a laser spot with a power for not annealing. The focus error signal and the tracking error signal are detected by the sub-beams 15 and 17, and the tracking control starts so that the main beam scans a position at which the side wall B is annealed through the differential push-pull method. The method of detecting the focus error signal is identical with those in the conventional art.

Starting with that state, the side wall B is consecutively annealed in the order of a detection mode B (S101), a tracking error signal correction mode B (S102), and an annealing treatment mode B (S103).

Then, the laser power drops down to a laser power for not annealing temporarily, and the respective spots are moved to the side wall A of the innermost periphery. Thereafter, the focus error signal and the tracking error signal are detected by the sub-beams 15 and 17, the polarity of the tracking error signal TE is changed over, and tracking is effected so that the main beam scans a position at which the side wall A is annealed through the differential push-pull method. Thereafter, the side wall A is consecutively annealed in the order of the tracking error signal correction mode A (S104) and the annealing treatment mode A (S105).

Then, the respective modes in FIG. 5 will be described in more detail. First, in the detection mode B of S101, the tracking error signal TEB10 attributable to the sub-beam 15 (or the tracking error signal TEB20 attributable to the sub-beam 17) in the non-annealed region of the innermost periphery is detected by the laser of the power for not annealing. Then, the tracking error signal TEB1 attributable to the sub-beam 15 (or the tracking error signal TEB2 attributable to the sub-beam 17) is detected while the side wall B is annealed with a desired high-output laser.

The TEB1 and TEB10 correspond to the TE1 of FIG. 11, and the TEB2 and TEB20 correspond to the TE2 of FIG. 11, and the TEB3 corresponds to the TE of FIG. 11.

In the correction mode B of S102, the track offset amount is corrected. That is, δ is obtained from the TEB10 and TEB1 (or TEB20 and TEB2) obtained in the detection mode, and an offset corresponding to +2δ is added to the push-pull tracking error signal TEB3 in conducting the annealing treatment for correction.

In the annealing treatment mode B of S103, after the TEB3 is corrected in the correction mode B of S102, the side wall B is consecutively annealed by the main beam 16 while the tracking control is conducted by using the obtained TEB3.

Then, the laser power drops down to a laser power for not annealing temporarily, and the respective beams are moved to the side wall A of the innermost periphery. Thereafter, an offset corresponding to −2δ added to the push-pull tracking error signal TEA3 in annealing the side wall A by using δ obtained in the correction mode B in the correction mode A of S104, for correction. In the annealing mode A of S105, after the polarity of the tracking error signal is changed over in the polarity switching circuit 46, the laser power is increased to the power for annealing. At the same time, the TEA3 is corrected in the correction mode A of S104, and the side wall A is consecutively annealed by the main beam 16 while the tracking control is conducted on the basis of the TEA3 that has been corrected. The tracking error signal TEA3 in the case of annealing the side wall A corresponds to the TE in FIG. 11.

Then, another embodiment of the present invention will be described below. In this embodiment, in the track offset amount that occurs at the time of annealing, the offset amount δ at the side wall that is subjected to a laser annealing treatment first is detected by monitoring the tracking error signal attributable to the sub-beam at the time where the side wall that is subjected to the laser annealing first is annealed by laser. Also, the offset amount δ' at the side wall that is subjected to a laser annealing treatment after is detected by monitoring the tracking error signal attributable to the sub-beam at the time where the side wall that is subjected to the laser annealing after is annealed by laser. That is, different electric signal amounts are corrected at the respective side walls. Other constructions are identical with those in FIG. 4.

More specifically, the side wall B is annealed in the order of the detection mode B, the correction mode B and the annealing mode B as in the above embodiment. Then, the step of the detection mode A is used at the time of annealing the side wall A, and thereafter the side wall A is annealed in the order of the correction mode A and the annealing mode A.

First, in the detection mode B, the tracking error signal TEB10 attributable to the sub-beam 15 (or the tracking error signal TEB20 attributable to the sub-beam 17) in the non-annealed region of the innermost periphery is monitored by the laser of the power for not annealing. Then, the tracking error signal TEB1 attributable to the sub-beam 15 (or the tracking error signal TEB2 attributable to the sub-beam 17) is monitored while the side wall B is annealed with the laser having a desired high output.

In the correction mode B, the track offset amount is corrected. That is, δ is obtained from the TEB10 and TEB1 (or TEB20 and TEB2) obtained in the detection mode by the offset correction circuit 48, and an offset corresponding to +2δ is added to the push-pull tracking error signal TEB3 at the time of annealing to conduct the correction.

In the annealing mode B, after the TEB3 is corrected in the correction mode B, the side wall B is consecutively annealed. At this time, the non-annealed region of at least one round remains.

Then, the laser power drops down to a laser power for not annealing temporarily, and the respective beams are moved to the side wall A of the innermost periphery. Thereafter, in the detection mode A, the tracking error signal TEA10 attributable to the sub-beam 15 (or the tracking error signal TEB20 attributable to the sub-beam 17) in the non-annealed region of the innermost periphery is monitored by the laser of the low power. Then, the tracking error signal TEA1 attributable to the sub-beam 15 (or the tracking error signal TEA2 attributable to the sub-beam 17) is monitored while the side wall A is annealed with the laser having a desired high output.

In the correction mode A, δ' is obtained from the TEA10 and TEA1 (or TEA20 and TEA2) obtained in the detection mode A, and an offset corresponding to −2δ' is added to the push-pull tracking error signal TEA3 at the time of annealing to conduct the correction.

In the annealing mode A, after the TEA3 is corrected in the correction mode A, the polarity of the tracking error signal is changed over, and the side wall A is consecutively annealed. Also, the TEA10 may be monitored after not the detection mode A but the detection mode B. In this case, it is unnecessary that the non-annealed region remains in the annealing mode B.

Then, still another embodiment of the present invention will be described below. In this embodiment, in the side wall to be annealed first, the tracking control of the main beam is conducted on the basis of the tracking error signal attributable to the sub-beam that precedes the main beam at the time of annealing, and in the side wall to be annealed next, the tracking control of the main beam is conducted on the basis of the tracking error signal attributable to the sub-beam that follows the main beam at the time of annealing. Accordingly, in the construction of this embodiment, the offset correction circuit 46 and the polarity switching circuit 48 in FIG. 4 are not required. Also, the tracking error detector circuit 45 detects the tracking error signal attributable to the sub-beam.

More specifically, as shown in FIGS. 8A and 8B, no offset occurs in the tracking error signal TEB1 of the sub-beam 15 that precedes the main beam at the time of annealing the side wall B by a laser of a high output. Therefore, the tracking control is conducted so that the main beam scans a position at which the side wall B is annealed on the basis of the TEB1, and the side wall B is annealed.

Also, as shown in FIGS. 10A and 10B, no offset occurs in the tracking error signal TEA2 of the sub-beam 17 that precedes the main beam at the time of annealing the side wall B by a laser of a high output. Therefore, the tracking control is conducted so that the main beam scans a position at which the side wall A is annealed on the basis of the TEA2, and the side wall A is annealed. The TEB1 corresponds to the TE1 of FIG. 11, and the TEA2 corresponds to the TE2 of FIG. 11.

In the above embodiment, a description was given of an example in which after the side wall (hereinafter referred to as "side wall B") directed toward the outer peripheral side is annealed from the inner peripheral side toward the outer peripheral side in advance, the side wall directed toward the inner peripheral side (hereinafter referred to as "side wall A") is annealed from the inner peripheral side toward the outer peripheral side, or the amount of reflected light is decreased by the annealing treatment. However, the present invention is not limited to this construction. Even in the case where the construction is different, the directions of the offsets δ and δ' of the push-pull error signals TEB3 and TEA3 at the time of annealing can be known in advance from the relational expression that obtains the tracking error signal from the divided sensor and the arrangement of the sub-beams and the main beam.

Also, the example in which the offset amount of the tracking error signal of the sub-beam in the non-annealed region is zero is described above. However, in the case where the offset amount is supplied to the tracking error signal of the sub-beam in the non-annealed region in advance, differences between the initial offset amount and the offsets of the push-pull error signals TEB3 and the TEA3 may be set to δ and δ'.

Next, an example of the present invention will be described.

EXAMPLE 2

Then, an embodiment of the present invention will be described in more detail with reference to specific examples. However, the present invention is not limited to the following examples without being apart from the subject matter of the present invention.

In Example 2, there was used a magnetic domain wall moving type magnetooptical recording medium. In the magnetic domain wall moving type magnetooptical recording medium, at least a first dielectric layer, a magnetic layer and a second dielectric layer were consecutively stacked on a transparent substrate having lands and grooves. The magnetic layer was made of a plurality of magnetic layers including a magnetic domain wall moving layer that contributed to at least the reproducing of information and moved a magnetic domain wall, a recording layer that held a recording magnetic domain according to the information, and a switching layer that was disposed between the magnetic domain wall moving layer and the recording layer and lower in the Curie temperature than those layers. The magnetic domain wall moving layer, the switching layer and the recording layer has switched connection when those layers were equal to or lower than the Curie temperature of the switching layer. In addition, the magnetic domain wall of the recording magnetic domain which has been transferred from the recording layer to the moving layer was moved, the recording magnetic domain was enlarged, and the information was reproduced.

Figure 6:
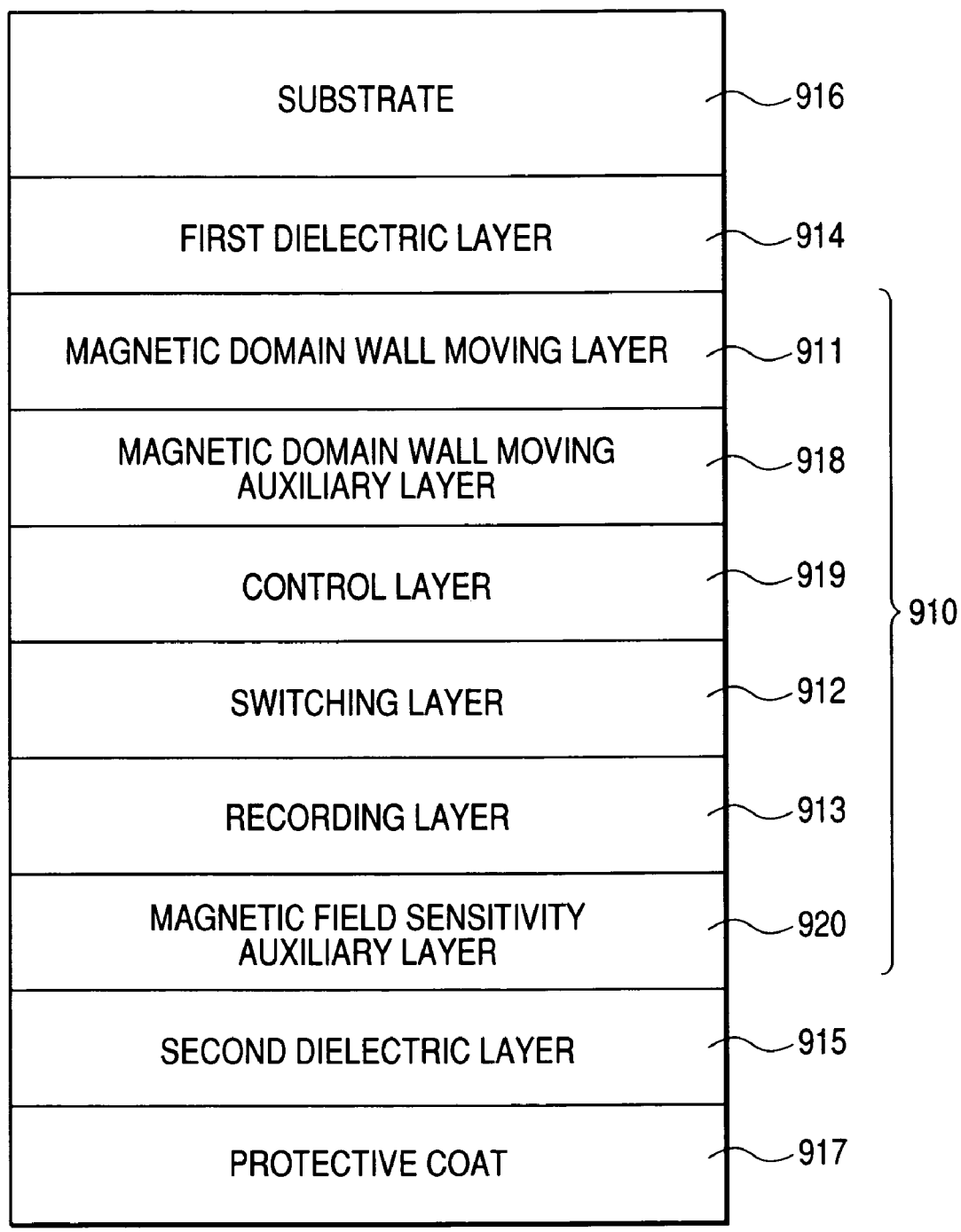
FIG. 6 is a cross-sectional view showing a magnetic domain wall moving magnetooptical recording medium used in Example of the present invention.

In more detail, as shown in FIG. 6, there was used a magnetic domain wall moving type magnetooptical recording medium in which a first dielectric layer 914, a magnetic domain wall moving layer 911, a magnetic domain wall moving auxiliary layer 918, a control layer 919, a switching layer 912, a recording layer 913, a magnetic field sensitivity auxiliary layer 920, a second dielectric layer 915 and a protective coat 917 were sequentially stacked on a transparent substrate 916. Reference numeral 910 denotes a magnetic layer.

In this example, there is shown an example in which the magnetic domain wall moving auxiliary layer 918 is disposed from the viewpoint of improving the reproducing characteristic as proposed in Japanese Patent Application Laid-Open No. 2000-207791. Also, as proposed in Japanese Patent Application Laid-Open No. 2000-187898, there is an example in which the control layer 919 is disposed in order to suppress an unnecessary magnetic domain wall movement (ghost signal) at the backward end within the reproduced beam spot. It is desirable that the control layer 919 is disposed between a layer to which the magnetic domain wall moves and the switching layer 912. Also, in this example, there is shown an example in which a recording magnetic field sensitivity auxiliary layer 920 is disposed at an opposite side of the substrate of the recording layer 913 from the viewpoint of the recording characteristic.

Here, a film thickness that obtains the optimum characteristic can be selected as the thickness of the respective magnetic layers. The composition of the respective magnetic layers can be selected from the compositions that obtain the optimum characteristic. In addition, it is possible that a metal layer made of Al, AlTa, AlTi, AlCr, AlSi, Cu, Pt, or Au is added to the above construction to adjust the thermal characteristic (not shown).

In addition, when the light modulation recording is conducted, a substrate on which a film has been formed may be bonded. Also, in the case where a laser beam is input from the film surface side to conduct reproducing, it is possible that the stacked order of the above respective layers is reversed, and laser annealing is conducted from the substrate surface.

The substrate 916 was produced by injection-molding polycarbonate. There was used a double spiral land/groove recording substrate that was 0.54 μm in the track pitch (a ratio of the land width and the groove width was about 1:1), 35 nm in the groove depth, and about 35° in the gradient angle of the side wall.

Also, an SiN layer was formed in the thickness of 35 nm as the first dielectric layer 914. A GdFeCoCr layer was formed in the thickness of 18 nm as the magnetic domain wall moving layer 911, and a GdFeCr layer was formed in the thickness of 18 nm as the magnetic domain wall moving auxiliary layer 918. Then, a TbFeCoCr layer was formed in the thickness of 18 nm as the control layer 919, a TbFeCr layer was formed in the thickness of 10 nm as the switching layer 912, a TbFeCoCr layer was formed in the thickness of 40 nm as the recording layer 913, and a GdFeCoCr layer was formed in the thickness of 13 nm as the recording magnetic field sensitivity auxiliary layer 920.

Finally, an SiN layer was formed in the thickness of 50 nm as the second dielectric layer 915. More specifically, the composition was adjusted as the magnetic domain wall moving layer such that a rare earth auxiliary lattice magnetization became dominant at a temperature ranging from a room temperature to the Curie temperature when the Curie temperature was about 300° C. The composition was adjusted as the moving auxiliary layer such that a transition metal element auxiliary lattice magnetization became dominant at a temperature ranging from a room temperature to the Curie temperature when the Curie temperature was about 215° C. The composition was adjusted as the control layer such that a rare earth auxiliary lattice magnetization became dominant at a temperature ranging from a room temperature to the Curie temperature when the Curie temperature was about 185° C. The composition was adjusted as the switching layer such that a compensation temperature became 140° C. when the Curie temperature was about 165° C. The composition was adjusted as the recording layer such that a transition metal element auxiliary lattice magnetization became dominant at a temperature ranging from a room temperature to the Curie temperature when the Curie temperature was about 330° C. In addition, the composition was adjusted as the recording magnetic field sensitivity auxiliary layer such that a compensation temperature became 300° C. when the Curie temperature was about 415° C.

Subsequently, the magnetic domain wall moving type magnetooptical recording medium thus produced was annealed. The wavelength of the annealing beam was 405 nm, and the NA of an objective lens was 0.85. Also, an optical system of the same three-beam method as the optical system described in the background art was used. In this example, there was applied a method in which a laser beam was condensed onto the side wall between the land and the groove which form the recording track from the second dielectric layer side at the opposite side of the substrate to conduct the annealing treatment.

First, the tracking control was conducted such that the main beam scanned a position at which the side wall B was annealed while the magnetooptical recording medium was rotated with a laser power of 1.5 mW and at a linear speed of 4.5 m/s in the detection mode B. In this situation, as a result of monitoring the tracking error signal TEB10 of the sub-beam 15 in the non-annealed region, the offset amount was zero.

Then, the laser power increased up to 5.8 mW, and the tracking error signal TEB1 attributable to the sub-beam 15 was monitored while the side wall B was annealed. As a result, the increased offset amount of 5% was detected with respect to the maximum amplitude of the error signal. Therefore, the offset amount of +10% was added to the push-pull tracking error signal TEB3 to correct the track offset amount in the correction mode B.

In the annealing mode B, the side wall B was subjected to tracking on the basis of the tracking error signal that corrected the tracking offset amount, and the annealing treatment was consecutively conducted from the inner periphery toward the outer periphery.

Then, the laser power dropped down to 1.5 mW (laser power for not annealing), the main beam was moved to the side wall A of the innermost periphery, the polarity of the TE was changed over, and the tracking was effected such that the main beam scanned a position at which the side wall A was annealed. Then, at the same time where the laser power increased to 5.8 mW, and the offset amount of 10% was added to the push-pull tracking error signal TEA3 to correct the track offset amount in the correction mode A. In the annealing mode A, the side wall A was subjected to tracking on the basis of the push-pull tracking error signal that corrected the track offset amount, and the annealing treatment was consecutively conducted from the inner periphery toward the outer periphery. After the annealing treatment, a protective coat made of polymeric resin was formed.

The recording and reproducing characteristic of the magnetooptical recording medium thus manufactured was evaluated by random data of the linear recording density 0.08 μm/bit (1-7) modulation provided that the laser wavelength was 650 nm, the N.A of the objective lens was 0.60, and the linear speed was 2.4 m/s. The evaluation index was an error rate of reproducing data with respect to the recording data, so-called bit error rate bER.

Also, recording was performed by irradiating a pulsed light, and modulating a magnetic field according to a recording signal during a cooling process after the magnetooptical recording medium was heated to the Curie temperature or higher of the recording layer. The pulse width was a time width of 50% with respect to the clock cycle of the recording signal, and the laser level was binary consisting of a recording power level and 0 level. On the other hand, reproducing was conducted by DC light. In this situation, the recording power was 6.4 mW, the modulated magnetic field intensity was 200 (Oe), and the reproducing power was 2.4 mW in the land portion. The recording power was 6.4 mW, the modulated magnetic field intensity was 200 (Oe), and the reproducing power was 2.3 mW in the groove portion.

The measurement was conducted as described, and bER was evaluated. As a result, no offset existed in both of the land and groove, and 2E-5 was obtained in the land, 1E-5 was obtained in the groove. Thus, the excellent characteristic was obtained in both of the land and the groove.

COMPARATIVE EXAMPLE 2

In this comparative example, the operation was identical with that in Example 2 except that the annealing treatment was conducted without correcting the offset of the tracking error signal at the time of annealing. As a result of evaluating the recording and reproducing characteristic (without correction) as in Example 2 by using the magnetooptical recording medium of Example 2, the offset of 35 nm occurred on the outer peripheral side in both of the land and the groove, 5E-5 was obtained in the land, and 4E-5 was obtained in the groove, thus deteriorating the characteristic.

EXAMPLE 3

In this Example, the substrate was produced by injection-molding polycarbonate. There was used a double spiral land/groove recording substrate that was 0.54 μm in the track pitch (a ratio of the land width and the groove width was about 1:1), and 35 nm in the groove depth, in which the gradient angles of the side wall were different between the side wall directed toward the inner peripheral side and the side wall directed toward the outer peripheral side. The magnetooptical recording medium having the same construction as that of Example 2 except for the substrate was prepared.

Then, the magnetic domain wall moving type magnetooptical recording medium was annealed. First, the tracking control was conducted such that the main beam scanned a position at which the side wall B was annealed while the magnetooptical recording medium was rotated with a laser power of 1.5 mW and at a linear speed of 4.5 m/s in the detection mode B. In this situation, as a result of monitoring the tracking error signal TEB10 of the sub-beam 15, the offset amount was zero.

Then, the laser power increased up to 5.8 mW, and the tracking error signal TEB1 attributable to the sub-beam 15 was monitored while the side wall B was annealed. As a result, the increased offset amount of 5% was detected with respect to the maximum amplitude of the error signal. Therefore, the offset amount of +10% was added to the push-pull tracking error signal TEB3 to correct the track offset amount in the correction mode B.

In the annealing mode B, the side wall B was subjected to tracking on the basis of the tracking error signal that corrected the tracking offset amount, and the annealing treatment was consecutively conducted from the inner periphery toward the outer periphery. In this situation, the non-annealed region of one round remains.

Then, the laser power dropped down to 1.5 mW (laser power for not annealing), the main beam was moved to the side wall A of the innermost periphery, the polarity of the TE was changed over, and the tracking was effected such that the main beam scanned a position at which the side wall A was annealed. In the detection mode A, as a result of monitoring the tracking error signal TEA10 of the sub-beam 15, the offset amount was zero.

Then, the laser power increased to 5.8 mW, and as a result of monitoring the tracking error signal TEA1 of the sub-beam 15 while the side wall A was annealed, the plus offset amount of 5.4% was detected with respect to the maximum amplitude of the error signal. Therefore, the offset amount of −10.8% was added to the push-pull tracking error signal TEA3 to correct the track offset amount in the correction mode A.

In the annealing mode A, the side wall A was subjected to tracking on the basis of the push-pull tracking error signal that corrects the track offset amount, and the annealing treatment was consecutively conducted from the inner periphery toward the outer periphery. After the annealing treatment, a protective coat made of polymeric resin was formed.

The recording and reproducing characteristic of the magnetooptical recording medium thus manufactured was evaluated similarly to Example 2. As a result, no offset existed in both of the land and groove, 2E-5 was obtained in the land, 1E-5 was obtained in the groove, and the excellent characteristic was obtained in both of the land and groove.

EXAMPLE 4

In this example, the magnetooptical recording medium having the same construction as that in Example 2 was used. The magnetooptical recording medium thus manufactured was annealed by using the same optical system as in Example 2.

The tracking control was conducted on the innermost peripheral side wall B of the magnetooptical recording medium such that the main beam scanned a position at which the side wall B was annealed on the basis of the tracking error signal attributable to the sub-beam 15 that preceded the main beam while the magnetooptical recording medium was irradiated with a laser beam of 5.8 mW and rotated at a linear speed of 4.5 m/s.

Then, the laser power dropped down to 1.5 mW (laser power for not annealing), the main beam was moved to the side wall A of the innermost periphery, and the tracking servo is effected such that the main beam scanned a position at which the side wall A was annealed on the basis of the tracking error signal of the sub-beam 17 that followed the main beam. Thereafter, the laser power increased to 5.8 mW, and the annealing treatment was conducted from the inner periphery toward the outer periphery. After the annealing treatment, a protective coat made of a polymeric resin was formed.

The recording and reproducing characteristic of the magnetooptical recording medium thus manufactured was evaluated similarly to Example 2. As a result, no offset existed in both of the land and groove, 2E-5 was obtained in the land, 1E-5 was obtained in the groove, and the excellent characteristic was obtained in both of the land and groove.

This application claims priorities from Japanese Patent Application Nos. 2004-015750 filed on Jan. 23, 2004, 2004-

095320 filed on Mar. 29, 2004, and 2004-125630 filed on Apr. 21, 2004, which are hereby incorporated by reference herein.

What is claimed is:

1. A method of annealing an optical recording medium formed on a substrate having a land and a groove, comprising the steps of:

annealing one side wall between the land and the groove with a predetermined laser power;

moving the laser to another side wall by allowing the laser to traverse one of the land and the groove with a laser power for not annealing after the step of annealing is conducted; and annealing the another side wall with the laser power, wherein each of the steps of annealing is conducted by using three light beams consisting of a main beam and two sub-beams, adjacent land and groove are tracked by the sub-beams, and the main beam is irradiated onto the side wall between the land and the groove, and wherein a track offset that occurs when conducting the steps of annealing is corrected such that a track offset at a side wall to be annealed first and a track offset at a side wall to be annealed next is made different.

2. The method of annealing an optical recording medium according to claim 1, wherein the optical recording medium comprises a magnetic domain wall moving type magnetooptical recording medium which comprises a magnetic domain wall moving layer, a switching layer, and a record holding layer.

3. The method of annealing an optical recording medium according to claim 1, wherein each of the steps of annealing is conducted at a constant linear speed.

4. The method of annealing an optical recording medium according to claim 1, wherein the correction is conducted such that only symbols of the track offset at the side wall to be annealed first and of the track offset at the side wall to be annealed next is made different.

5. The method of annealing an optical recording medium according to claim 1, wherein the track offset is detected by monitoring a tracking error signal attributable to the sub-beam at a time of annealing the side wall to be annealed first.

6. The method of annealing an optical recording medium according to claim 1, wherein the correction is conducted such that both of symbols and amounts of the track offset at the side wall to be annealed first and of the track offset at the side wall to be annealed next are made different.

7. The method of annealing an optical recording medium according to claim 6, wherein, in the track offset amounts, an offset amount $\delta$ at the side wall to be annealed first is detected by monitoring the tracking offset signal attributable to the sub-beam at a time of annealing the side wall to be annealed first, and an offset amount $\delta'$ at the side wall to be annealed next is detected by monitoring the tracking error signal attributable to the sub-beam at a time of annealing the side wall to be annealed next.

8. The method of annealing an optical recording medium according to claim 6, wherein tracking control of the main beam is conducted on the basis of the tracking error signal attributable to the sub-beam that precedes the main beam at the side wall to be annealed first, and tracking control of the main beam is conducted on the basis of the tracking eror signal attributable to the sub-beam that follows the main beam at the side wall to be annealed next.

* * * * *

UNITED STATES PATENT AND TRADEMARK OFFICE
CERTIFICATE OF CORRECTION

PATENT NO. : 7,376,055 B2 Page 1 of 1
APPLICATION NO. : 11/033727
DATED : May 20, 2008
INVENTOR(S) : Kazuoki Hongu et al.

It is certified that error appears in the above-identified patent and that said Letters Patent is hereby corrected as shown below:

COLUMN 3
Line 52, "Example" should read --Example 2--.

COLUMN 20
Line 29, "eror" should read --error--.

Signed and Sealed this

Eighteenth Day of November, 2008

JON W. DUDAS
*Director of the United States Patent and Trademark Office*